No. 710,263. Patented Sept. 30, 1902.
J. FRANKLIN.
CULTIVATOR.
(Application filed Apr. 4, 1902.)
(No Model.)
Fig. I.
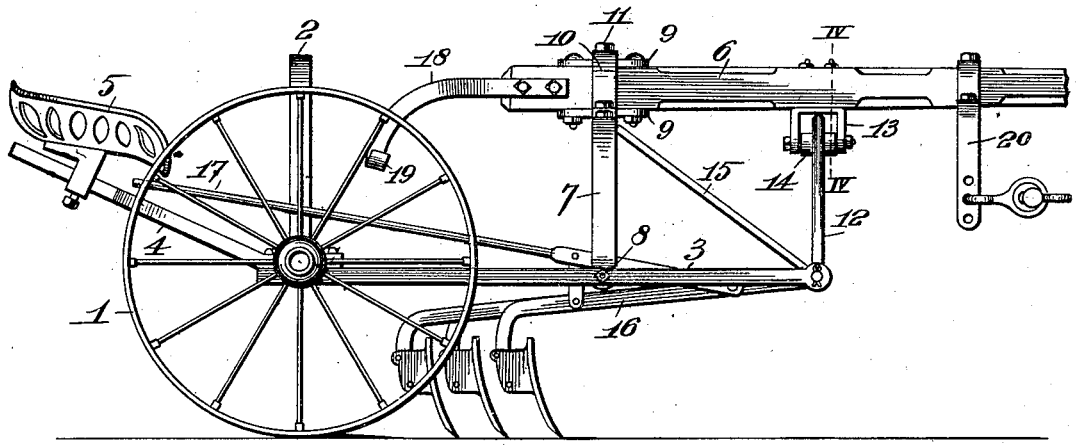
Fig. II.
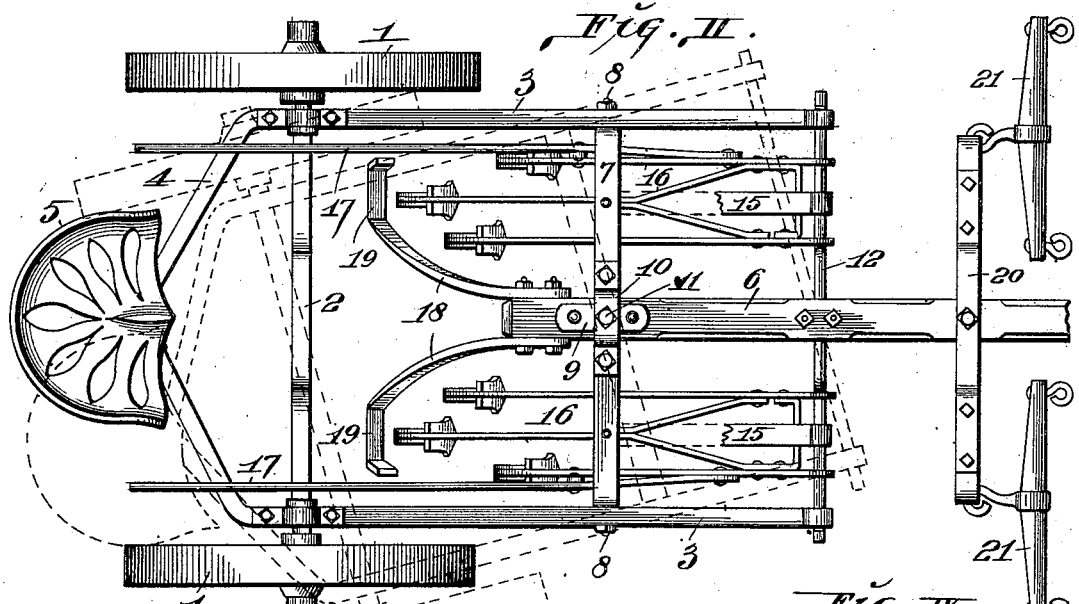
Fig. III.   Fig. IV.
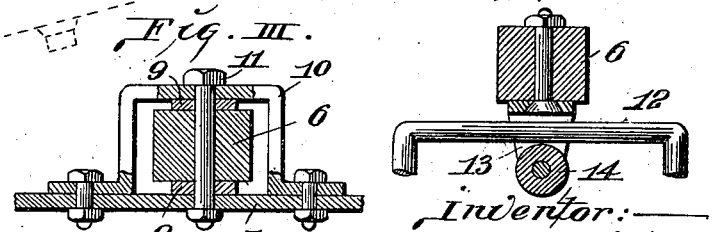
attest:—
M. Smith
T. S. Knight
Inventor:—
Joshua Franklin:—
By Wright Bros attys.
THE NORRIS PETERS CO., PHOTO-LITHO., WASHINGTON, D. C.

UNITED STATES PATENT OFFICE.

JOSHUA FRANKLIN, OF MOSELEY, ALABAMA.

CULTIVATOR.

SPECIFICATION forming part of Letters Patent No. 710,263, dated September 30, 1902.

Application filed April 4, 1902. Serial No. 101,354. (No model.)

*To all whom it may concern:*

Be it known that I, JOSHUA FRANKLIN, a citizen of the United States, residing at Moseley, in the county of Clay and State of Alabama, have invented certain new and useful Improvements in Cultivators, of which the following is a full, clear, and exact description, reference being had to the accompanying drawings, forming part of this specification.

My invention relates to a cultivator intended more particularly for use in cultivating cotton or other tender plants, though serviceable in the cultivation of other plants growing in rows.

The invention has for its object the construction of a cultivator wherein it is rendered possible for the operator or driver seated upon the implement to move the cultivator-shovels either to the right or left, with respect to the row of plants traversed, in such manner as to direct the shovels away from the plants, which would otherwise be uprooted in deviations of the course of the planted rows by the cultivator-shovels cutting thereinto.

The invention consists in features of novelty hereinafter fully described, and pointed out in the claims.

Figure I is a view in side elevation of my cultivator. Fig. II is a top or plan view. Fig. III is an enlarged detail view, partly in elevation and partly in cross-section, taken through the cultivator tongue and arch. Fig. IV is an enlarged cross-sectional view taken on line IV IV, Fig. I.

1 designates the ground-wheels of the cultivator, in which is mounted an arch-axle 2.

3 designates the side bars of a frame, mounted on the axle 2 and extending forwardly therefrom, and 4 is a seat-support extending rearwardly from the side bars 3, to which a seat 5 is movably fitted.

6 is the draft-tongue of the cultivator, that is mounted upon an arch 7, the arms of which extend downwardly and are connected at 8 to the side bars 3 of the cultivator-frame. Fixed to the tongue 6 above and beneath it are wear-plates 9.

10 is a strap attached to the arch 7 at the location of the tongue 6, so as to inclose said tongue, and 11 is a pivot-bolt that passes through the strap 10, tongue 6, the wear-plates 9, and the arch 7 to provide for the pivotal action of said tongue and arch with respect to each other.

12 designates an arch-hanger having its arch loosely fitted in a yoke 13, carried by the tongue 6 forward of the arch 7 and adapted to rest and ride upon a roller 14, journaled in said yoke. The ends of the arch-hanger 12 extend laterally in each direction from the arch of the hanger and are seated in the forward ends of the frame side bars 3.

15 designates braces that unite the arch-hanger 12 to the arch 7.

16 designates the cultivator-plows, loosely fitted to the outturned portions of the arch-hanger 12, so as to be capable of vertical movement, and attached to each plow is a lift-lever 17, extending rearwardly into proximity with the driver's seat 5, so as to be in convenient reach by the driver to lift the plows out of the ground to clear obstructions in the path of travel of the plows.

18 designates push-arms attached to the rear end of the tongue 6 and provided at their free ends with foot-rests 19, adapted to receive the feet of the driver occupying the seat 5, the arms being spread outwardly to afford opportunity for leverage by the driver's feet against the arms.

20 is the doubletree, attached to the tongue 6 and having connected thereto singletrees 21.

The object to be attained in the practical use of this cultivator is, as has been stated, the accomplishment of movement of the plows of the cultivator either to the right or left with respect to the row of plants being cultivated, so as to direct the plow-shovels away from plants out of line with the row or in crooked rows in which the plants would be uprooted by the plows if their course were continued in a straight line following the direction of the travel of the team by which the cultivator is drawn. This object I obtain by the construction described, wherein the plows and frame of the cultivator by which the plows are carried and guided are subject to the control of the driver mounted on the cultivator. By this arrangement the driver may by a simple pressure of the foot to exert force against the push-arms 18 cause the plows and means by which they are carried and guided to swing to the right or left irrespective of the position of the tongue of the cultivator, owing to the pivotal connection between said means and the tongue, and be therefore moved simultaneously at each side of the row being cultivated and caused to follow the course of the row wherever crooks or bends occur therein.

To illustrate the action of the parts, it will be assumed that it is desired to swing the cultivator-plows to the right to follow the course of a bend or curve in the row of plants tending in a direction toward the right. To so move the plows, the driver exerts pressure with his right foot against a foot-rest 19 on the right-hand push-arm 18. The result of such pressure against the foot-arm mentioned is that the cultivator-frame and arch-hanger 12 are caused to swing to the right, with the arch of the arch-hanger moving in the yoke 13, carried by the tongue 6 and riding on the roller 14, and as a consequence the ground-wheels, cultivator-axle, frame, arch-hanger, and the cultivator-plows connected to said arch-hanger are caused to swing to the right with said swinging members, thus directing the plows toward the right hand. To direct the course of the plows toward the left hand to follow the course of the row of plants in that direction, the driver by pressure exerted against a foot-rest on the left-hand push-arm 19 causes the swinging members, and consequently the plows, to be swung toward the left hand, as illustrated by dotted lines in Fig. II, the movement being similar to that in which the plows are directed toward the right hand.

It will be seen from the foregoing that the cultivator-plows are by the construction described wholly within the control of the driver mounted on the seat 5 and can be readily and quickly directed toward or away from the row of plants being cultivated by pressure against the foot-rests and push-arms 18 to swing the plows in the desired directions.

A feature of very considerable merit in this cultivator is that of the plows being mounted forward of the axle of the cultivator, so as to be in front of the driver on the seat 5 in order that the driver may watch them continually to observe their position with relation to the plants in the row traversed at the same time that he watches the feet of the team drawing the cultivator. It is therefore possible for the driver to prevent the team from tramping on the plants in the row and watch the proximity of the plows to the plants to direct them as close as desirable to such plants while guiding them with respect to the row in such manner that they will not cut the row and uproot the plants. The plows being located in front of the driver, it is also possible for him to observe the covering of any plants and conveniently reach the ground to uncover them without dismounting.

My cultivator is more particularly intended for use in the cultivation of cotton or other tender slow-growing plants that require to be treated very carefully to prevent their being covered by soil or destroyed in the process of cultivation, and such treatment is fully provided for in the cultivator I have designed. By reason of the driver being mounted upon the cultivator in a low position near the ground, so that he may at any time reach the plants of the row being cultivated, it is convenient for him to watch the progress of the work being done, inasmuch as it is immediately in front of him, and whenever one of the plow-shovels throws soil onto a plant he can with the utmost readiness reach the ground and remove the soil gently therefrom without the least danger of injury to the plant and without liability of any of the plants being covered and remaining so after the cultivator has passed by.

I claim as my invention—

1. The combination with the ground-wheels and axle; of side bars extending forwardly from the axle, a seat-support extending rearwardly from the axle, a seat movably fitted thereon, an arch secured to the side bars intermediate their ends, a tongue pivotally mounted upon the arch, push-arms attached to the rear ends of the tongue, an arch-hanger forming a forward rest for the tongue, having its ends turned outwardly, and seated in the forward ends of the side bars, plows having a vertical movement upon outwardly-turned end of the arch-hanger, and lift-lever extending from the plows rearwardly to a point adjacent to the seat.

2. The combination with the ground-wheel and axle; of side bars extending forwardly from the axle, an arch secured to the side bars intermediate their ends, a tongue pivotally mounted upon the arch, push-arms attached to the rear ends of the tongue, an arch-hanger forming a forward rest for the tongue, having its ends turned outwardly, and seated in the forward ends of the side bars, and plows having a vertical movement upon outwardly-turned end of the arch-hanger.

3. The combination with the ground-wheels and axle, of a rectangular frame extending forwardly from the axle, plows pivoted to the front of the frame to swing vertically only and operating in advance of the axle, an arch secured to the side bars of the frame intermediate their ends, a tongue having pivotal connection with the arch, and means carried by said tongue adapted to receive pressure to produce a lateral swing of the plows simultaneously with the frame, axle and wheels.

JOSHUA FRANKLIN.

In presence of—
　W. B. NEWMAN,
　J. E. CAMP.